United States Patent Office.

JOHN AMBROSE FLEMING, OF HAMPSTEAD, COUNTY OF MIDDLESEX, ENGLAND.

PREPARATION OR PRODUCTION OF INSULATING MATERIALS OR ARTICLES.

SPECIFICATION forming part of Letters Patent No. 284,289, dated September 4, 1883.

Application filed August 8, 1883. (No specimens.) Patented in England May 22, 1882, No. 2,414; in France October 24, 1882, No. 151,723; in Germany October 27, 1882, No. 22,335, and in India May 11, 1883, No. 73.

*To all whom it may concern:*

Be it known that I, JOHN AMBROSE FLEMING, a subject of the Queen of Great Britain and Ireland, and residing at 3 Greenhill Villas, Hampstead, in the county of Middlesex, England, Doctor of Science, have invented certain new and useful Improvements in the Preparation or Production of Insulating Materials or Articles, (for which I have obtained Letters Patent in Great Britain, No. 2,414, bearing date May 22, 1882; in France, No. 151,723, bearing date October 24, 1882; in Germany, No. 22,335, bearing date October 27, 1882, and in India, No. 73, bearing date May 11, 1883;) and I do hereby declare that the following is a full, clear, and exact description of the invention, which will enable others skilled in the art to which it appertains to make and use the same.

My invention relates to the preparation or production of insulating materials or articles—that is to say, materials or articles which, when used for such purpose, are capable of interrupting the communication or preventing the escape of electricity; and it has reference partly to a former invention, in respect of which I obtained Letters Patent in the United States of America, No. 259,271, June 6, 1882.

According to the first part of my present invention, I prepare the materials by taking solid wood, (preferably English poplar,) and thoroughly desiccating the same, either in a vacuum or by superheated steam or otherwise, and then impregnating it, under pressure, with a mixture consisting of melted bitumen or asphalt, incorporated with a substance or substances of the resin type and a substance or substances of the paraffine type or of the anthracene type, or of both the paraffine and anthracene types. Among the substances of the paraffine type which I may use in the said mixture are paraffine proper, hatchettine or mineral tallow, and sheererite, the point to be looked to being that the melting-point should not be too low. Among the substances of the anthracene type which may be used are anthracene, naphthaline, pyrene, and chrysene, similar considerations also applying here. The resins which may be used in this part of my invention are the substances known commercially as "resin" or "rosin," which are the exudation of various species of pines and firs. The material thus prepared is cut or shaped with tools into the required form.

According to the second part of my invention, in lieu of employing solid wood, I take wood in a finely-divided condition, or other vegetable fibrous material—such, for example, as wood-flour, bran, straw, cotton, jute, hemp, papier-maché—in a finely-divided condition; and having thoroughly desiccated the same in a vacuum, or by superheated steam or otherwise, I saturate or impregnate it, under pressure or not, with a mixture consisting of melted bitumen or asphalt, incorporated with a substance or substances of the resin type, in conjunction or not with a substance or substances of the paraffine type or of the anthracene type, or of both the paraffine and anthracene types, and then mold the mass, under pressure, into the required shape. The substances of the paraffine and anthracene types which may be used are the same as in the former part of my invention. Those of the resin type which may be used are those mentioned above, with the addition of the fossil resin, amber, provided that (if amber is used) neither paraffine nor anthracene is used, or is only used in so small a proportion that it does not affect the practicability of effecting a thorough mixture of the ingredients of the mixture. I find that the melting-point of amber is too high to admit of its being readily made to mix with substances of the paraffine and anthracene types for the purposes of my invention.

In order that my invention may be perfectly understood, I shall now proceed particularly to describe the best methods with which I am acquainted of carrying the same into effect.

In carrying out the first part of my invention I take solid wood, (preferably English poplar,) thoroughly desiccated, either in a vacuum or by superheated steam, or otherwise, by the aid of any one of the well-known types of apparatus for such purposes, and I then impregnate it, under pressure, with the following mixture: I take what is commonly called "paraffine-wax" and reduce the same to a molten condition, and then add to it resin of any one of the types of that product above mentioned in that behalf, (by preference previously comminuted,) in the proportion of, say, about two parts, by weight, of paraffine-wax to one part, by weight, of resin, and to this mixture I add sufficient bitumen or asphalt (also by preference previously powdered) to render the whole perfectly black without impairing its fluidity when kept at a temperature of, say, about 200° centigrade. It should be observed that the object of using the bitumen or asphalt is to obtain an impregnating material with a higher melting-point than is attainable when paraffine-wax and resin are alone employed. The mixture, having been maintained at the said temperature and stirred for a sufficient length of time for the whole of the ingredients to become thoroughly incorporated, is then ready for use for the impregnation of the wood, as hereinbefore described. Although for ordinary insulating purposes I prefer to compose the impregnating mixture as hereinbefore described, yet I may substitute in the said mixture for what is commonly called "paraffine-wax" other or others of the substances of the paraffine type, or one or more of the substances of the anthracene type, as hereinabove stated; or I may use one or more of the substances of both the paraffine and anthracene types in conjunction, it being clearly understood that bitumen or asphalt and resin are in all cases employed. The material thus prepared is cut or shaped with tools into the required form.

In carrying out the second part of my invention I take wood-flour, or wood reduced to a fine state of division, or other vegetable fibrous material—such, for example, as bran, straw, cotton, jute, hemp, or papier-maché—in a finely-divided condition, and thoroughly desiccate the same, either in a vacuum or by superheated steam, hot air, or otherwise. I also take equal parts, by weight, of bitumen or asphalt and amber, the bitumen or asphalt being first comminuted, and the amber prepared by preliminary heating the same, so as to render it more easily fusible, and then reducing it to the state of powder. I then introduce the vegetable fibrous material in a finely-divided state, together with the prepared bitumen or asphalt and amber, (in the proportion of, say, about equal parts, by weight, of the finely-divided vegetable material, and of the bitumen or asphalt and amber taken together,) into a drum, and subject the same to an elevated temperature of, say, about 200° centigrade, while continually stirring the mixture for a sufficient length of time for the whole to become thoroughly incorporated. I then introduce the material thus prepared into a mold of the required form (by preference previously warmed) and subject it to pressure, as described in the specification to my said former Letters Patent, No. 259,271, June 6, 1882, and I allow the material to remain in the mold until cool, when it is taken out and will be found to have become perfectly hard, and to possess high insulating qualities.

For some purposes I may substitute for amber ordinary resin or resins, either with or without the addition of amber, but all in cases in conjunction with bitumen or asphalt, and I may in some cases add small quantities—say, for example, in the proportion of about from five to ten per cent. of the bitumen or asphalt and resin used—of one or more of the substances of either the paraffine type or of the anthracene type before referred to, or both of such types. For ordinary insulating purposes, however, I prefer the mixture above mentioned.

The proportions in which the several ingredients are employed may be somewhat varied according to circumstances and the exigencies of particular cases; but those mentioned have been found to give good results in practice.

Having fully described my invention, what I claim, and desire to secure by Letters Patent, is—

1. The preparation or production of insulating materials or articles by the employment of wood deprived of its moisture and impregnated, under pressure, with a mixture consisting of melted bitumen or asphalt incorporated with a substance or substances of the resin type, as herein set forth, and also with a substance or substances of the paraffine type or of the anthracene type, or of both the paraffine and anthracene types, substantially as hereinbefore described.

2. The preparation or production of insulating materials or articles by the employment of wood or other vegetable fibrous material, as herein set forth, in a finely-divided condition, desiccated and saturated or impregnated with a mixture consisting of melted bitumen or asphalt, incorporated with a substance or substances of the resin type, as herein set forth, in conjunction or not with a substance or substances of the paraffine type or of the anthracene type, or of both the paraffine and anthracene types, the whole being molded under pressure, substantially as hereinbefore described.

In testimony whereof I have signed my name to this specification in the presence of two subscribing witnesses.

JOHN AMBROSE FLEMING.

Witnesses:
THOMAS JOHN HANDFORD,
42 *Southampton Buildings, London.*
EDMUND WISE SEARLE,
*Clerk to the above,* 42 *Southampton Buildings, London.*